US012679382B2

(12) United States Patent (10) Patent No.: US 12,679,382 B2
Shahriari et al. (45) Date of Patent: Jul. 14, 2026

(54) GRADE ANGLE ESTIMATION SYSTEM BASED ON THREE-DIMENSIONAL MAP DATA

(71) Applicant: GM Global Technology Operations LLC, Detroit, MI (US)

(72) Inventors: Mohammadali Shahriari, Markham (CA); Kevin A. O'Dea, Ann Arbor, MI (US); Khizar Ahmad Qureshi, Pickering (CA); Puneet Bagga, Etobicoke (CA); Dhaval Kavindra Sompura, Canton, MI (US); Ashraf Abualfellat, Grand Blanc, MI (US); Dmitriy Feldman, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 91 days.

(21) Appl. No.: 18/788,723

(22) Filed: Jul. 30, 2024

(65) Prior Publication Data

US 2026/0034994 A1     Feb. 5, 2026

(51) Int. Cl.
  B60W 40/076 (2012.01)
  B60W 30/14 (2006.01)
  G01C 21/36 (2006.01)
(52) U.S. Cl.
  CPC .......... B60W 40/076 (2013.01); B60W 30/14 (2013.01); G01C 21/3635 (2013.01)
(58) Field of Classification Search
  CPC .. B60W 40/076; B60W 30/14; G01C 21/3635
  See application file for complete search history.

(56) References Cited

U.S. PATENT DOCUMENTS

| | | | | |
|---|---|---|---|---|
| 9,454,508 | B2 * | 9/2016 | Yu | G06F 17/00 |
| 11,420,634 | B2 * | 8/2022 | Gokcek | B60W 40/107 |
| 2005/0021229 | A1 * | 1/2005 | Lee | G01C 21/30 701/472 |
| 2012/0109439 | A1 * | 5/2012 | Akebono | B60W 30/186 701/22 |
| 2019/0003839 | A1 * | 1/2019 | Hu | G06F 16/29 |
| 2019/0129435 | A1 * | 5/2019 | Madsen | A01B 69/008 |
| 2022/0097676 | A1 * | 3/2022 | Gesang | B60W 20/14 |
| 2024/0011775 | A1 | 1/2024 | Shah et al. | |
| 2024/0383482 | A1 * | 11/2024 | Boydston | G01S 17/931 |

FOREIGN PATENT DOCUMENTS

CN          112078585 A     12/2020

* cited by examiner

*Primary Examiner* — Faris S Almatrahi
*Assistant Examiner* — Dana F Artimez
(74) *Attorney, Agent, or Firm* — Vivacqua Crane, PLLC

(57) ABSTRACT

A grade angle estimation system for estimating a grade angle of a roadway that a vehicle is driving along includes one or more controllers. The one or more controllers include one or more processors that execute instructions to receive three-dimensional map data of the roadway and measurements indicating a grade angle of the roadway collected by an inertial measurement unit (IMU). The one or more controllers determine an IMU-based grade angle based on the measurements received by the IMU and compare an absolute value of the IMU-based grade angle with a threshold grade value. In response to determining the absolute value of the IMU-based grade angle is greater than the threshold grade value, the one or more controllers set the grade angle equal to the IMU-based grade angle.

20 Claims, 6 Drawing Sheets

GRADE ANGLE ESTIMATION SYSTEM BASED ON THREE-DIMENSIONAL MAP DATA

INTRODUCTION

The present disclosure relates to a grade angle estimation system for a vehicle that estimates a grade angle of a roadway based on either three-dimensional map data or measurements collected from an inertial measurement unit (IMU).

Many vehicles include driver assistance systems that support a driver in a variety of ways. One example of a driver assistance system is an adaptive cruise control (ACC) system, which may relieve drivers from routine longitudinal vehicle control by ensuring an ego vehicle is an acceptable headway distance from a vehicle that immediately precedes the ego vehicle.

Adaptive cruise control systems require an estimate of the grade of the roadway that the ego vehicle is driving along to effectively track the current speed of the vehicle and for headway distance control. The current approach to estimate the grade of the roadway relies upon measurements collected by the ego vehicle's inertial measurement unit (IMU). However, it is to be appreciated that the adaptive cruise control system relies upon a reactive estimate of the grade of the roadway, as the ego vehicle has to actually drive along the roadway in order for the IMU to collect measurements. As a result, the adaptive cruise control system may not be able to proactively react to a transition or change in the grade of the roadway.

Thus, while current driver assistance systems achieve their intended purpose, there is a need in the art for an improved approach for estimating the grade angle of a roadway.

SUMMARY

According to several aspects, a grade angle estimation system for estimating a grade angle of a roadway that a vehicle is driving along is disclosed. The grade angle estimation system includes one or more controllers, where the one or more controllers include one or more processors that execute instructions to receive three-dimensional map data of the roadway and measurements indicating a grade angle of the roadway collected by an inertial measurement unit (IMU), where the three-dimensional map data is capped and omits the grade angle of the roadway once the grade angle exceeds a predefined capped value. The one or more controllers determine an IMU-based grade angle based on the measurements received by the IMU, where the IMU-based grade angle is measured at a current position of the vehicle along the roadway. The one or more controllers compare an absolute value of the IMU-based grade angle with a threshold grade value, where the threshold grade value is equal to the predefined capped value of the three-dimensional map data. In response to determining the absolute value of the IMU-based grade angle is less than or equal to the threshold grade value, the one or more controllers set the grade angle equal to a look-ahead angle. The look-ahead angle is calculated based on the three-dimensional map data and represents a grade angle of the roadway at a look-ahead distance. In response to determining the absolute value of the IMU-based grade angle is greater than the threshold grade value, the one or more controllers set the grade angle equal to the IMU-based grade angle. The one or more controllers transmit the grade angle to one or more vehicular systems that are part of the vehicle, where the one or more vehicular systems determine one or more control actions of the vehicle based on the grade angle.

In another aspect, the one or more controllers execute instructions to in response to determining the grade angle is equal to the look-ahead angle, extract grade angle data from the three-dimensional map data, transmit the grade angle data to a filter, and determine, by the filter, filtered grade data based on the grade angle data, where a time constant is introduced to the filtered grade data by the filter and the time constant includes a time lag.

In yet another aspect, the one or more controllers execute instructions to determine the time lag introduced to the filtered grade data and perform a time shift correction that shifts a time of the filtered grade data by the time lag introduced by the time constant, where the filtered grade data determined by the filter compensates for the time lag.

In an aspect, the one or more vehicular systems include an adaptive cruise control system.

In another aspect, the one or more controllers execute instructions to determine a look-ahead grade of the roadway measured at the look-ahead distance based on the filtered grade data from the three-dimensional map data, determine a difference between the look-ahead grade and a current grade, where the vehicle is positioned along the roadway at the current grade, and compare an absolute value of the difference with a threshold angle difference, where the threshold angle difference reflects a change in a road grade between a current position of the vehicle and the look-ahead distance.

In yet another aspect, the one or more controllers execute instructions to in response to determining the absolute value of the difference is greater than the threshold angle difference, determine the roadway is about to undergo a transition in the grade angle, and instruct the adaptive cruise control system to perform preemptive control based on the transition in the grade angle of the roadway.

In an aspect, the one or more controllers perform preemptive control by determining a source of the grade angle, in response to determining the grade angle is equal to the look-ahead angle, calculating a map-based acceleration command that is a product of a map-based gain value and the look-ahead angle, and in response to determining the grade angle is equal to the IMU-based grade angle, calculating an IMU-based acceleration command that is a product of an IMU-based gain value and the IMU-based grade angle.

In another aspect, the one or more controllers execute instructions to in response to determining the absolute value of the difference is equal to or less than the threshold angle difference, predict the vehicle will be at a peak of a hill, and instruct the adaptive cruise control system to perform preemptive control based on predicting the vehicle to be at the peak of the hill.

In yet another aspect, the one or more controllers execute instructions to monitor perception data received from a plurality of perception sensors to determine the presence of a preceding vehicle located in front of the vehicle, and in response to determining the presence of a preceding vehicle, execute an object selection strategy to follow the preceding vehicle located in front of the vehicle at a defined headway distance.

In an aspect, the three-dimensional map data is high-definition (HD) map data.

In another aspect, the one or more controllers execute instructions to calculate a difference between the IMU-based grade angle and a map-based angle, where the map-based angle represents the grade angle of the roadway at a look-ahead distance of zero and is based on the three-dimensional map data, compare the difference between the IMU-based grade angle and the map-based angle with an upper limit threshold value and a lower limit threshold value, and in response to determining the difference between the IMU-based grade angle and the map-based angle is either greater than the upper limit threshold value or less than the lower limit threshold value, set the grade angle equal to the IMU-based grade angle.

In yet another aspect, the one or more controllers execute instructions to monitor perception data collected by a plurality of perception sensors to detect the presence of a trailer being towed by the vehicle, in response to detecting the presence of the trailer, determine a sign of the grade angle of the roadway, and in response to determining the sign of the grade angle of the roadway is negative, determine the vehicle is traveling downhill and calculate a downhill headway offset time that is a function of the grade angle of the roadway.

In an aspect, the one or more controllers execute instructions to in response to determining the sign of the grade angle of the roadway is positive, determine the vehicle is travelling uphill and calculate an uphill headway offset time that is a function of the grade angle of the roadway.

In another aspect, a method for estimating a grade angle of a roadway that a vehicle is driving along. The method includes receiving, by one or more controllers, three-dimensional map data of the roadway and measurements indicating a grade angle of the roadway collected by an IMU, wherein the three-dimensional map data is capped and omits the grade angle of the roadway once the grade angle exceeds a predefined capped value. The method includes determining, by the one or more controllers, an IMU-based grade angle based on the measurements received by the IMU, where the IMU-based grade angle is measured at a current position of the vehicle along the roadway. The method includes comparing, by the one or more controllers, an absolute value of the IMU-based grade angle with a threshold grade value, where the threshold grade value is equal to the predefined capped value of the three-dimensional map data. In response to determining the absolute value of the IMU-based grade angle is less than or equal to the threshold grade value, the method includes setting the grade angle equal to a look-ahead angle, wherein the look-ahead angle is calculated based on the three-dimensional map data and represents a grade angle of the roadway at a look-ahead distance. In response to determining the absolute value of the IMU-based grade angle is greater than the threshold grade value, the method includes setting the grade angle equal to the IMU-based grade angle. Finally, the method includes transmitting the grade angle to one or more vehicular systems that are part of the vehicle, where the one or more vehicular systems determine one or more control actions of the vehicle based on the grade angle.

In another aspect, a grade angle estimation system for estimating a grade angle of a roadway that a vehicle is driving along is disclosed. The grade angle estimation system includes one or more controllers. The one or more controllers include one or more processors that execute instructions to receive three-dimensional map data of the roadway and measurements indicating a grade angle of the roadway collected by an IMU, where the three-dimensional map data is capped and omits the grade angle of the roadway once the grade angle exceeds a predefined capped value. The one or more controllers determine an IMU-based grade angle based on the measurements received by the IMU, where the IMU-based grade angle is measured at a current position of the vehicle along the roadway. The one or more controllers compare an absolute value of the IMU-based grade angle with a threshold grade value, where the threshold grade value is equal to the predefined capped value of the three-dimensional map data. In response to determining the absolute value of the IMU-based grade angle is less than or equal to the threshold grade value, the one or more controllers set the grade angle equal to a look-ahead angle, where the look-ahead angle is calculated based on the three-dimensional map data and represents a grade angle of the roadway at a look-ahead distance. In response to determining the absolute value of the IMU-based grade angle is greater than the threshold grade value, the one or more controllers set the grade angle equal to the IMU-based grade angle. The one or more controllers transmit the grade angle to an adaptive cruise control system that is part of the vehicle. The adaptive cruise control system determines one or more control actions of the vehicle based on the grade angle. In response to determining the grade angle is equal to the look-ahead angle, the one or more controllers extract grade angle data from the three-dimensional map data. The one or more controllers transmit the grade angle data to a filter, and determine, by the filter, filtered grade data based on the grade angle data. A time constant is introduced to the filtered grade data by the filter and includes a time lag. The one or more controllers determine the time lag introduced to the filtered grade data and performs a time shift correction that shifts a time of the filtered grade data by the time lag introduced by the time constant, where the filtered grade data determined by the filter compensates for the time lag.

In another aspect, the one or more controllers execute instructions to determine a look-ahead grade of the roadway measured at the look-ahead distance based on the filtered grade data, determine a difference between the look-ahead grade and a current grade, wherein the vehicle is positioned along the roadway at the current grade, and compare an absolute value of the difference with a threshold angle difference, where the threshold angle difference reflects a change in a road grade between a current position of the vehicle and the look-ahead distance.

In yet another aspect, the one or more controllers execute instructions to in response to determining the absolute value of the difference is greater than the threshold angle difference, determine the roadway is about to undergo a transition in the grade angle, and instruct the adaptive cruise control system to perform preemptive control based on the transition in the grade angle of the roadway.

In an aspect, the one or more controllers perform preemptive control by determining a source of the grade angle, in response to determining the grade angle is equal to the look-ahead angle, calculating a map-based acceleration command that is a product of a map-based gain value and the look-ahead angle, and in response to determining the grade angle is equal to the IMU-based grade angle, calculating an IMU-based acceleration command that is a product of an IMU-based gain value and the IMU-based grade angle.

In another aspect, the one or more controllers execute instructions to in response to determining the absolute value of the difference is equal to or less than the threshold angle difference, predict the vehicle will be at a peak of a hill, and instruct the adaptive cruise control system to perform preemptive control based on predicting the vehicle to be at the peak of the hill.

In yet another aspect, the one or more controllers execute instructions to monitor perception data received from a plurality of perception sensors to determine the presence of a preceding vehicle located in front of the vehicle, and in response to determining the presence of a preceding vehicle, execute an object selection strategy to follow the preceding vehicle located in front of the vehicle at a defined headway distance.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
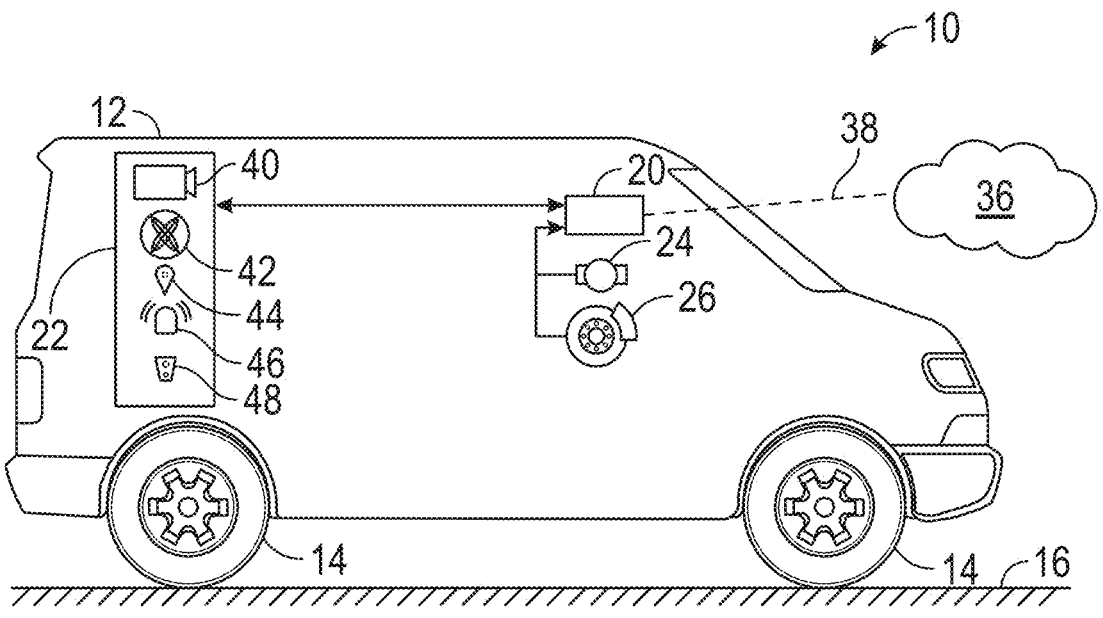
FIG. 1 is a schematic diagram of a vehicle including the disclosed grade angle estimation system having one or more controllers in electronic communication with a plurality of perception sensors including an inertial measurement unit (IMU) and a source of three-dimensional map data, according to an exemplary embodiment.

Referring to FIG. 1, a schematic diagram of an exemplary grade angle estimation system 10 for a vehicle 12 is illustrated. It is to be appreciated that the vehicle 12 may be any type of vehicle such as, but not limited to, a sedan, truck, sport utility vehicle, van, or motor home. In one non-limiting embodiment, the grade angle estimation system 10 is part of an adaptive cruise control (ACC) system of the vehicle 12. Although an adaptive cruise control system is described, it is to be appreciated that the grade angle estimation system 10 may be part of any vehicular control system that relies upon an estimate of the grade angle of a roadway 16 that the vehicle 12 is driving along to execute one or more control actions. Merely by way of example, in another embodiment the grade angle estimation system 10 is part of a collision imminent braking system or a propulsion control system for an electric vehicle.

The grade angle estimation system 10 includes one or more controllers 20 in electronic communication with a plurality of perception sensors 22, a prime mover 24, and a braking system 26. In embodiments, the one or more controllers 20 are also in wireless communication with one or more communication networks 36, where the one or more controllers 20 obtain three-dimensional map data 38 of the roadway 16 the vehicle 12 is driving along via the communication network 36. Alternatively, the three-dimensional map data 38 may be stored locally. It is to be appreciated that the three-dimensional map data 38 may include any type of map data that includes information regarding the grade angle of the roadway 16 such as, but not limited to, high-definition (HD) map data, medium-definition (MD) map data, and navigation map data.

In the non-limiting embodiment as shown in FIG. 1, the plurality of perception sensors 22 include one or more cameras 40, an inertial measurement unit (IMU) 42, a global positioning system (GPS) 44, radar 46, and LIDAR 48, however, is to be appreciated that additional sensors may be used as well. The plurality of perception sensors 22 provide perception data regarding the environment surrounding the vehicle 12 to the one or more controllers 20. The prime mover 24 represents a source of power that propels the vehicle 12 and includes an internal combustion engine, one or more electric motors, or a combination of an internal combustion engine and one or more electric motors. The braking system 26 includes a set of brakes corresponding to each wheel 14 of the vehicle 12.

It is to be appreciated that in some instances, the three-dimensional map data 38 is limited, or capped. When the three-dimensional map data 38 is capped, the three-dimensional map data 38 does not indicate or omits the grade angle of the roadway once the grade angle exceeds a predefined capped value. However, it is to be appreciated that the actual grade angle of the roadway 16 may be greater than the predefined capped value of the three-dimensional map data 38. Merely by way of example, HD map data includes a predefined capped value of ten percent, however, the actual grade angle of the roadway 16 may include values of up to fifty-five percent. Furthermore, it is to be appreciated that the adaptive cruise control system is disabled at twenty-four percent. Thus, the one or more controllers 20 estimate the grade angle of the roadway 16 at a prediction horizon based on either measurements indicative of the grade angle of the roadway 16 collected by the IMU 42 or the three-dimensional map data 38 according to an arbitration strategy, which is described below. The measurements received from the IMU 42 include, for example, the linear acceleration, angular velocity, and magnetic field strength.

Figure 2:
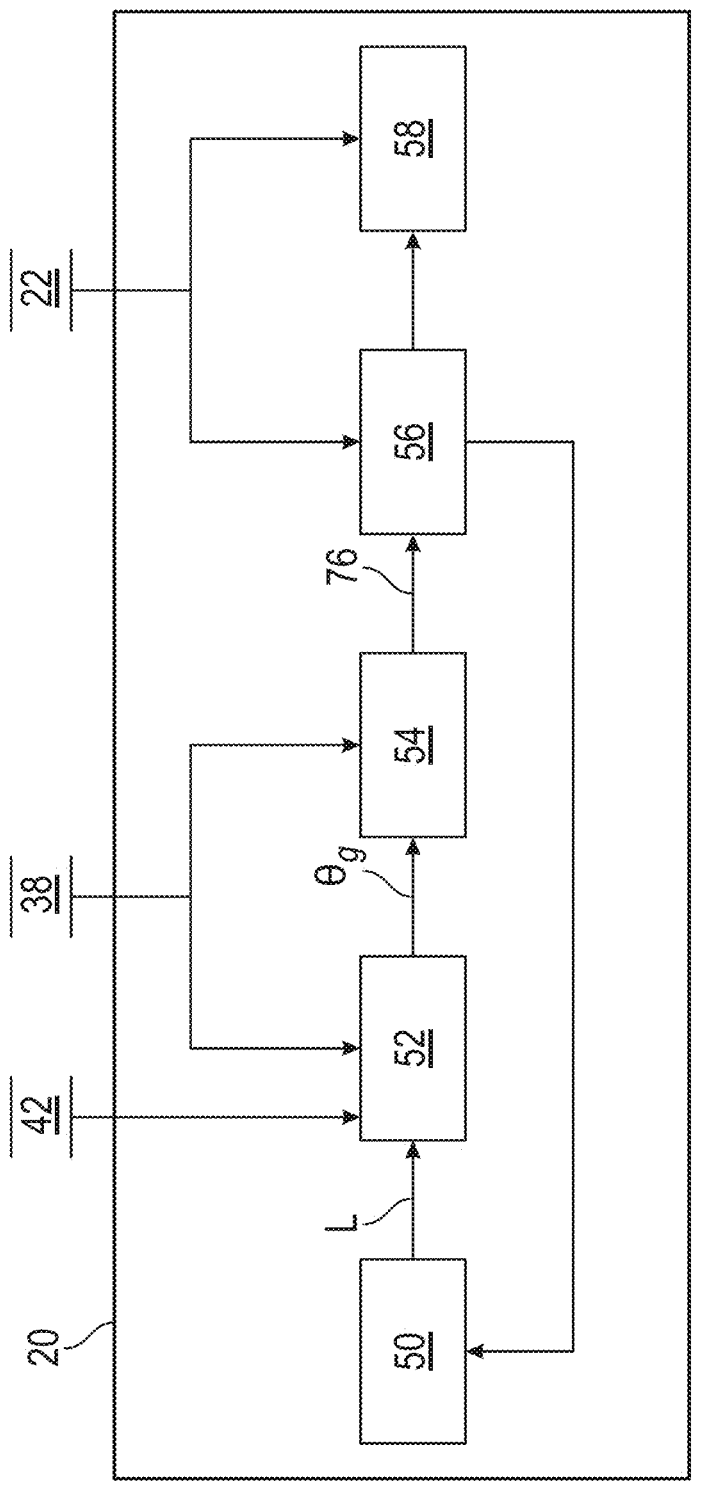
FIG. 2 is a block diagram illustrating a software architecture of the one or more controllers of the grade angle estimation system shown in FIG. 1, according to an exemplary embodiment.

FIG. 2 is a block diagram illustrating a software architecture of the one or more controllers 20 of the grade angle estimation system 10. The one or more controllers 20 include a proactive grade compensation module 50, an arbitration module 52, a lagless filter module 54, an elevation and peak detection module 56, and a headway time adjustment module 58.

The proactive grade compensation module 50 determines a look-ahead distance L located along the roadway 16 (FIG. 1). It is to be appreciated that the look-ahead distance L may also be referred to as the prediction horizon. The proactive grade compensation module 50 determines the look-ahead distance L based on a time calibration value K and the speed $V_x$ of the vehicle 12, where the time calibration value K represents a period of time where the look-ahead distance L is located. For example, in one embodiment, the time calibration value K may be two seconds, and therefore the look-ahead distance is measured two seconds ahead of the vehicle 12. The proactive grade compensation module 50 determines the look-ahead distance L based on a grade rate of transition H of the roadway 16. Specifically, in response to determining the grade rate of transition H is zero, the proactive grade compensation module 50 determines the look-ahead distance L is equal to the time calibration value K multiplied by the vehicle speed $V_x$ of the vehicle 12 (i.e., $L=K*V_x$). In response to determining the grade rate of transition H is a non-zero value (i.e., the roadway 16 is undergoing a grade transition), then the look-ahead distance L is a function of the vehicle speed $V_x$, the current road grade, and a rate of change of the road grade (i.e., $L=f(K, V_x, H)$).

Figure 3:
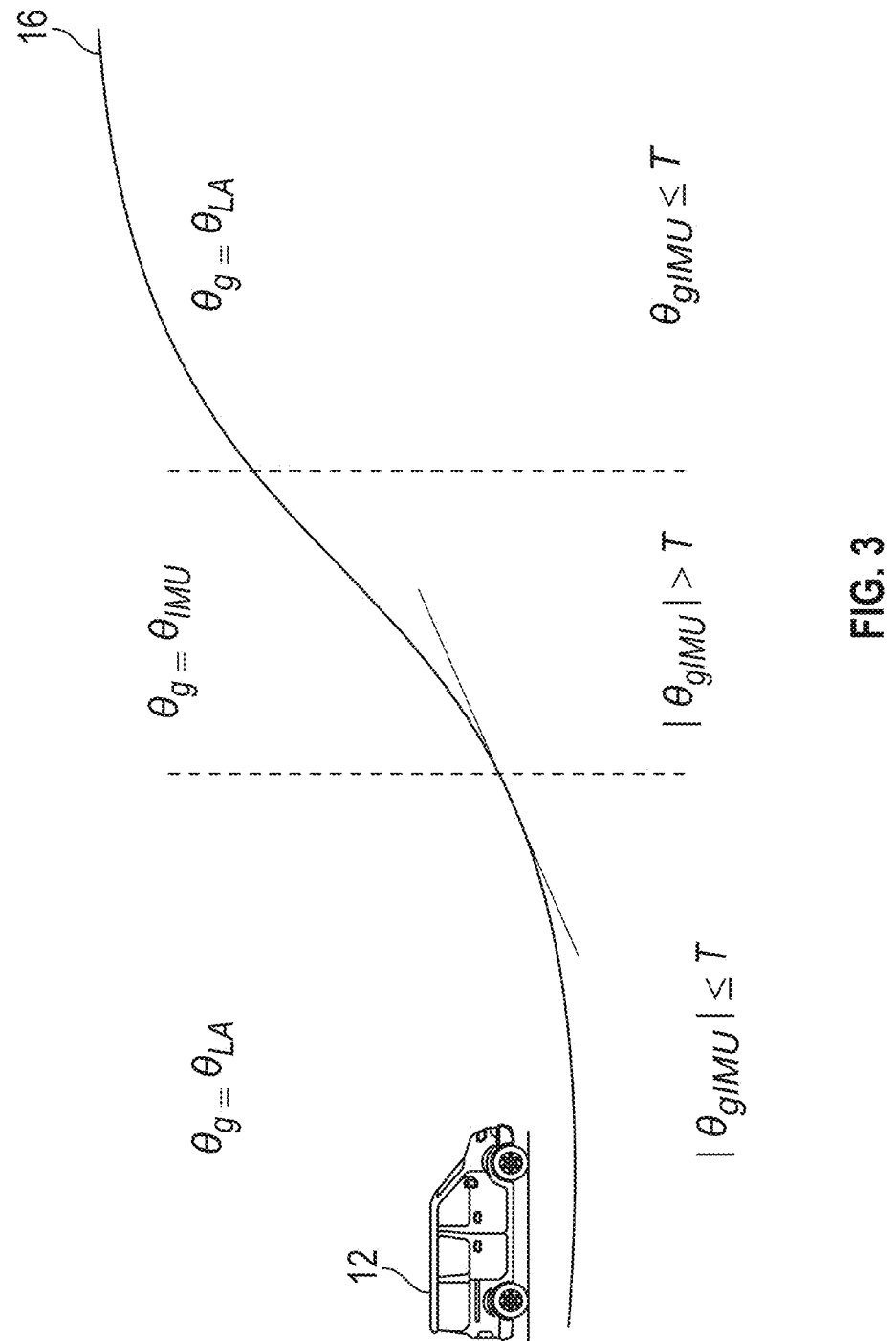
FIG. 3 is a diagram illustrating the arbitration strategy performed by the one or more controllers, according to an exemplary embodiment.

The arbitration module 52 receives the look-ahead distance L from the proactive grade compensation module 50 and executes the arbitration strategy to estimate the grade angle of the roadway 16 (FIG. 1) based on either the measurements received from the IMU 42 or the three-dimensional map data 38. FIG. 3 is a diagram illustrating the arbitration strategy. Referring to both FIGS. 2 and 3, the arbitration module 52 receives the measurements indicating the road grade from the IMU 42 and the three-dimensional map data 38 as input. The arbitration module 52 determines an IMU-based grade angle $\theta_{gIMU}$ based on the measurements received by the IMU 42, where the IMU-based grade angle $\theta_{gIMU}$ is measured at the current position of the vehicle 12 along the roadway 16. The arbitration module 52 compares an absolute value of the IMU-based grade angle $|\theta_{gIMU}|$ with a threshold grade value T, where the threshold grade value T is equal to the predefined capped value of the three-dimensional map data 38. For example, if the three-dimensional map data 38 is HD map data, then the threshold value is ten percent.

In response to determining the absolute value of the IMU-based grade angle $|\theta_{gIMU}|$ is less than or equal to the threshold grade value T, the arbitration module 52 sets the grade angle $\theta_g$ equal to a look-ahead angle $\theta_{LA}$. The look-ahead angle $\theta_{LA}$ is calculated based on the three-dimensional map data 38, where the look-ahead angle $\theta_{LA}$ represents a grade angle of the roadway 16 at the look-ahead distance L. In response to determining the absolute value of the IMU-based grade angle $\theta_{gIMU}$ is greater than the threshold grade value T, the arbitration module 52 sets the grade angle $\theta_g$ equal to the IMU-based grade angle $\theta_{gIMU}$.

In an embodiment, the arbitration module 52 employs an arbitration error to determine the grade angle $\theta_g$. Specifically, the arbitration module 52 calculates a difference between the IMU-based grade angle $\theta_{gIMU}$ and a map-based angle $\theta_{g.map}$, where the map-based angle $\theta_{g.map}$ represents a grade angle of the roadway 16 at a look-ahead distance of zero and is based on the three-dimensional map data 38. The arbitration module 52 compares the difference between the IMU-based grade angle $\theta_{gIMU}$ and the map-based angle $\theta_{g.map}$ with an upper limit threshold value $k_1$ and a lower limit threshold value $k_2$. In response to determining the difference between the IMU-based grade angle $\theta_{gIMU}$ and the map-based angle $\theta_{g.map}$ is either greater than the upper limit threshold value $k_1$ or less than the lower limit threshold value $k_2$ ($\theta_{g.map}-\theta_{gIMU}>k_1$ OR $\theta_{g.map}-\theta_{gIMU}<k_2$), the arbitration module 52 sets the grade angle $\theta_g$ equal to the IMU-based grade angle $\theta_{gIMU}$. It is to be appreciated that the upper limit threshold value $k_1$ and the lower limit value $k_2$ are provided to allow for asymmetry between the upper and lower threshold values.

The arbitration module 52 may transmit the grade angle $\theta_g$ to one or more of the vehicular control systems that are part of the vehicle 12 (FIG. 1), where the one or more vehicular control systems determine one or more control actions based on the grade angle $\theta_g$. It is to be appreciated that when the grade angle $\theta_g$ is equal to the look-ahead angle $\theta_{LA}$, the one or more vehicular systems may proactively determine one or more control actions of the vehicle 12 based on the look-ahead angle $\theta_{LA}$. In other words, the vehicular systems may determine control actions based on upcoming or imminent changes in the road grade. As an example, when the vehicular system is an adaptive cruise control system, the adaptive cruise control system proactively performs control actions such as hill peak detection and dynamic gap adjustment as described below and shown in FIGS. 5A and 5B based on the look-ahead angle $\theta_{LA}$.

Figure 4:
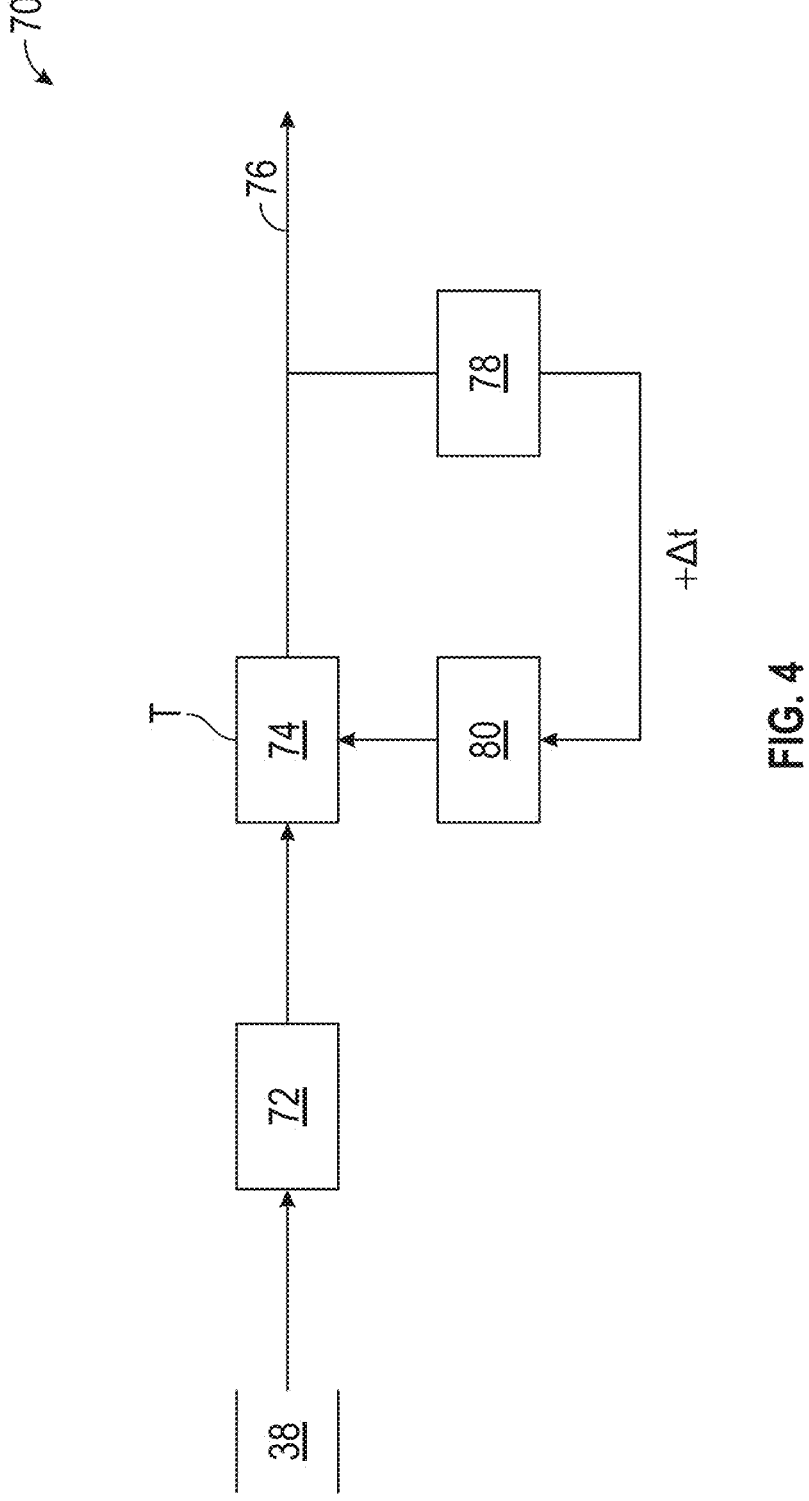
FIG. 4 is a block diagram illustrating a lagless filter, according to an exemplary embodiment.

Referring to FIG. 2, the lagless filter module 54 receives the three-dimensional map data 38 when the grade angle $\theta_g$ is equal to the look-ahead angle $\theta_{LA}$. FIG. 4 is a block diagram illustrating a lagless filter 70 implemented by the lagless filter module 54. Referring to both FIGS. 2 and 4, the lagless filter 70 includes a grade extraction module 72, a filter 74 that determines filtered grade data 76 from the three-dimensional map data 38, a latency detection module 78, and a look-ahead time update module 80. The grade extraction module 72 of the lagless filter 70 receives the three-dimensional map data 38 at the look-ahead distance L as input, and extracts grade angle data from the three-dimensional map data 38. The grade angle data is then transmitted to the filter 74. The filter may be any type of filter for removing noise and uncertainty from the grade angle data such as an adaptive filter. The filter 74 determines the filtered grade data 76 at the look-ahead distance L based on the grade angle data, where a time constant $\tau$ is introduced to the filtered grade data 76 by the filter 74.

It is to be appreciated that the time constant $\tau$ introduces a time lag+$\Delta t$ to the filtered grade data 76 at the look-ahead distance L. The latency detection module 78 receives the filtered grade data 76 at the look-ahead distance L as input and determines the time lag+$\Delta t$ introduced to the filtered grade data 76 by the filter 74. The latency detection module 78 then transmits the time lag+$\Delta t$ to the look-ahead time update module 80. The look-ahead time update module 80 instructs the grade extraction module 72 to perform a time shift correction that shifts a time of the three-dimensional map data 38 by the time lag+$\Delta t$ introduced by the time constant $\tau$. Accordingly, the filtered grade data 76 determined by the filter 74 compensates for the time lag+$\Delta t$ introduced to the filtered grade data 76 by the filter 74.

Figure 5A:
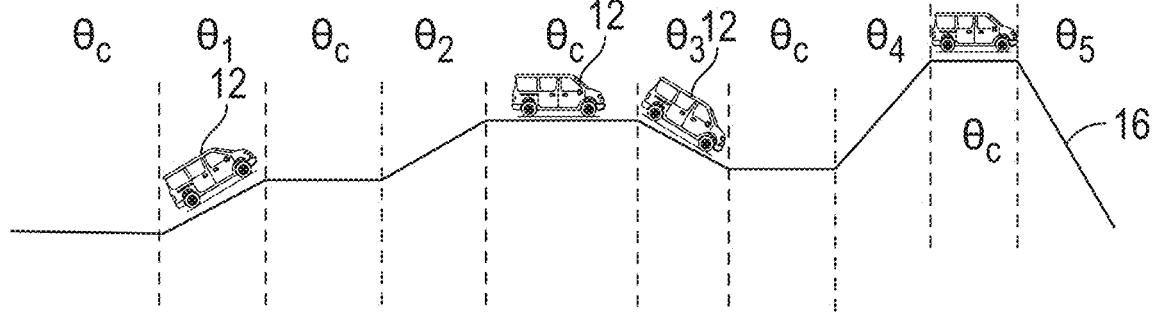
FIG. 5A illustrates an exemplary profile of a roadway the vehicle travels along, according to an exemplary embodiment.
Figure 5B:
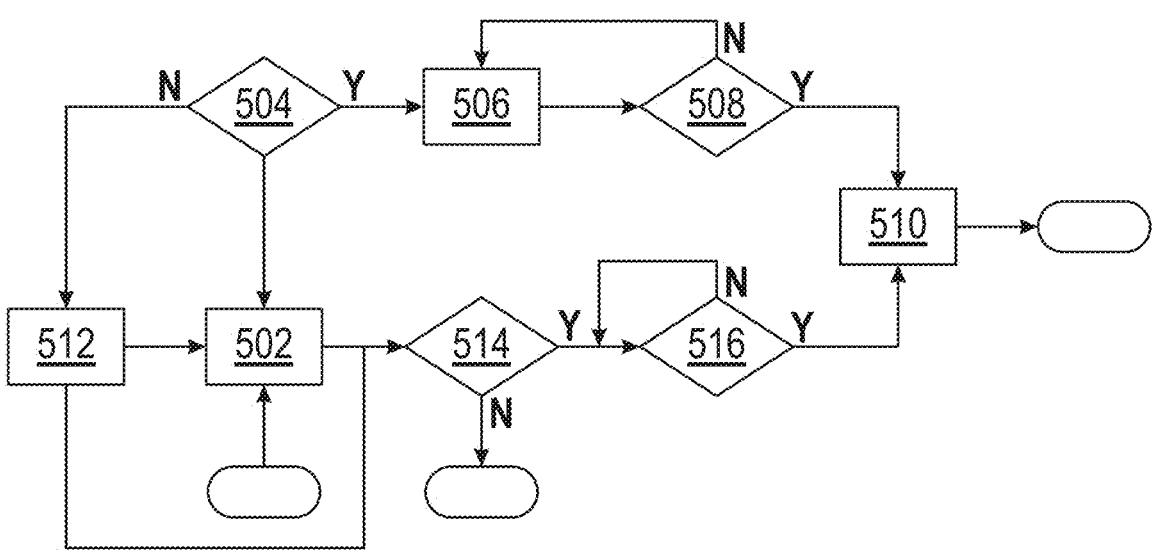
FIG. 5B illustrates a process flow diagram illustrating a method executed by an elevation and peak detection module of the one or more controllers shown in FIG. 2, according to an exemplary embodiment.

Referring to FIG. 2, the elevation and peak detection module 56 receives the filtered grade data 76 at the look-ahead distance L from the lagless filter module 54. FIG. 5A illustrates an exemplary profile of the roadway 16 and FIG. 5B illustrates a process flow diagram illustrating a method 500 executed by the elevation and peak detection module 56 of the one or more controllers 20. Referring to FIG. 5A, the vehicle 12 is positioned along the roadway 16 at a current grade $\theta_c$, and approaches a look-ahead grade $\theta_x$ measured at the look-ahead distance L (where x=1, 2, 3, 4, 5). The look-ahead grade $\theta_x$ is either an uphill or downhill grade.

The elevation and peak detection module 56 determines an elevation transition of the roadway 16, performs hill peak detection, and performs dynamic gap adjustment based on the method 500 illustrated in FIG. 5B. Referring now to FIGS. 2, 5A, and 5B, the method 500 begins at block 502, where the elevation and peak detection module 56 receives the filtered grade data 76 at the look-ahead distance L from the lagless filter module 54 and the perception data collected by the plurality of perception sensors 22 (FIG. 1). The elevation and peak detection module 56 determines the look-ahead grade $\theta_x$ of the roadway 16 measured at the look-ahead distance L based on the filtered grade data 76. The method 500 may then proceed to block 504.

In block 504, the elevation and peak detection module 56 determines a difference between the look-ahead grade $\theta_x$ and the current grade $\theta_c$, and compares an absolute value of the difference with a threshold angle difference $\theta_t$, where the threshold angle difference $\theta_t$ is selected to reflect a change in the road grade between the current position of the vehicle 12 and the look-ahead distance L, or $|(\theta_x)-\theta_c|>\theta_t$. In response to determining the absolute value of the difference is greater than the threshold angle difference $\theta_t$, the method 500 may proceed to block 506. Otherwise, the method proceeds to block 512, which is described below.

In block 506, the elevation and peak detection module 56 saves the difference between the look-ahead grade $\theta_x$ and the current grade $\theta_c$ in memory as a current change region (R[i]). The elevation and peak detection module 56 may also determine the roadway 16 is about to undergo a transition in the grade angle and transmits a notification to the proactive grade compensation module 50 indicating the transition. The proactive grade compensation module 50 may then instruct the adaptive cruise control system to perform preemptive control based on the transition in the grade angle of the roadway 16, which is described below and shown in FIG. 6. The method 500 may then proceed to decision block 508.

In decision block 508, the elevation and peak detection module 56 compares the current change region (R[i]) with the last change region (R[i−1]) stored in the memory. In response to determining the current change region (R[i]) is opposite of the last change region (R[i−1]), the method proceeds to block 510. Otherwise, the method 500 returns to block 506.

In block 510, the elevation and peak detection module 56 predicts the vehicle 12 will be at a peak of a hill. The elevation and peak detection module 56 may then send a notification predicting the vehicle 12 will be the peak of a hill to the proactive grade compensation module 50. The proactive grade compensation module 50 may then instruct the adaptive cruise control system to perform preemptive control based on predicting the vehicle 12 to be at the peak of a hill, which is described below and shown in FIG. 6. The method 500 may then terminate.

Referring back to block 504, in response to determining the absolute value of the difference is equal to or less than the threshold angle difference $\theta_t$, the method 500 may proceed to block 512. In block 512, the elevation and peak detection module 56 predicts the vehicle 12 will be at a peak of a hill. The elevation and peak detection module 56 may then send a notification predicting the vehicle 12 to be at the peak of a hill to the proactive grade compensation module 50. The proactive grade compensation module 50 may then instruct the adaptive cruise control system to perform preemptive control based on predicting the vehicle 12 will be at the peak of a hill, which is described below and shown in FIG. 6. The method 500 may then proceed to block 514.

In block 514, the elevation and peak detection module 56 monitors the perception data received from the plurality of perception sensors 22 to determine the presence of a preceding vehicle located in front of the vehicle 12. In response to determining the presence of a preceding vehicle, the method 500 may then proceed to block 516. Otherwise, the method 500 terminates.

In block 516, in response to detecting the presence of the preceding vehicle, the proactive grade compensation module 50 executes an object selection strategy to follow the preceding vehicle located in front of the vehicle 12 at a defined headway distance. The proactive grade compensation module 50 continues to execute the object selection strategy until the elevation and peak detection module 56 determines the vehicle 12 is at the current grade $\theta_c$.

The object selection strategy allows for the proactive grade compensation module 50 to recall that the presence of the preceding vehicle (or another detected object, such as a hidden object), even when an active perception system of the vehicle 12, which relies upon the perception data collected by the plurality of perception sensors 22 (FIG. 1), no longer indicates the presence of the preceding vehicle. The objection selection strategy may continue to report the presence of the preceding vehicle based on any number of approaches such as, but not limited to, the prediction term of a Kalman filter, kinematic propagation based on the last detected position, velocity, and acceleration of the preceding vehicle, a neural network, or holding the last position.

The method 500 may then proceed to block 510. As mentioned above, in block 510, the elevation and peak detection module 56 predicts the vehicle 12 will be at a peak of a hill. The proactive grade compensation module 50 may then instruct the adaptive cruise control system to perform preemptive control based on predicting the vehicle 12 will be at the peak of a hill, which is described below and shown in FIG. 6. The method 500 may then terminate.

Figures 6, 7:
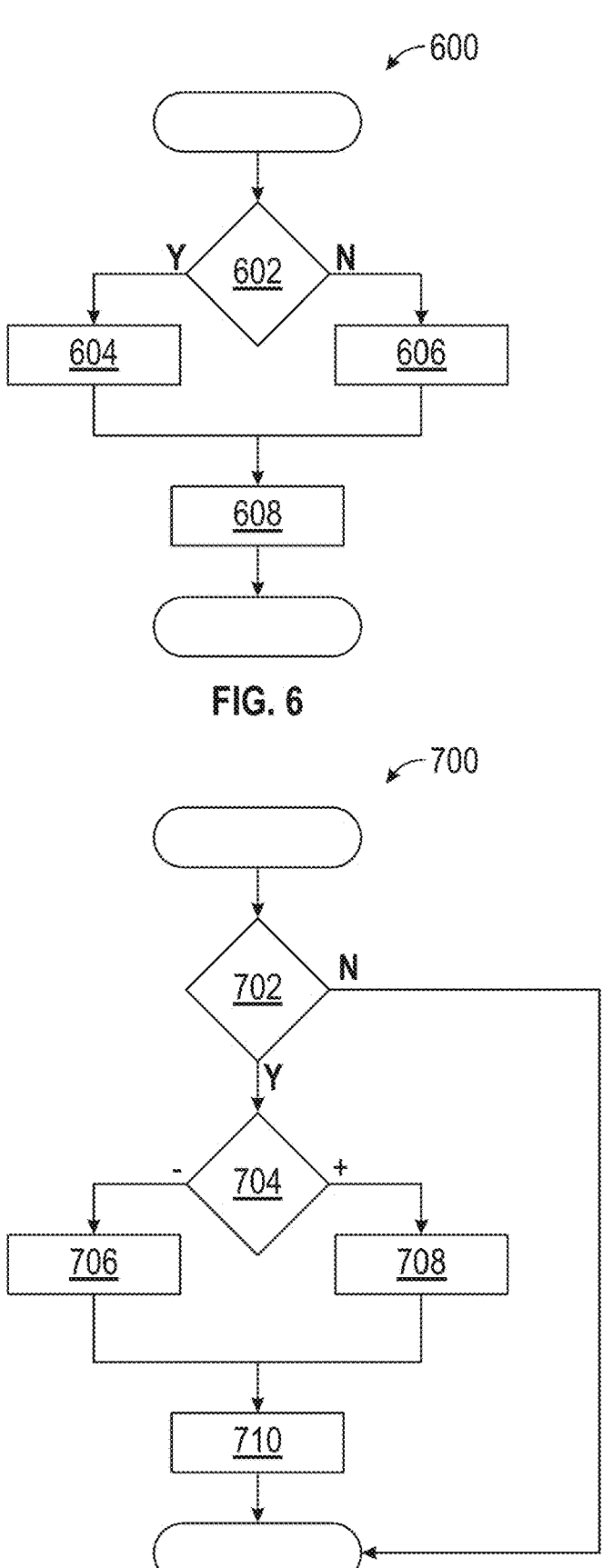
FIG. 6 is a process flow diagram illustrating a method for performing preemptive control based on the transition in the grade angle of the roadway, according to an exemplary embodiment.
FIG. 7 is a process flow diagram illustrating a method for adjusting the headway time based on the presence of a trailer and the grade angle of the roadway, according to an exemplary embodiment.

FIG. 6 is a process flow diagram illustrating a method 600 of preemptively controlling the vehicle 12 by the adaptive cruise control system. Referring to FIGS. 2 and 6, the proactive grade compensation module 50 preemptively controls the adaptive cruise control system based on the transition in the grade angle of the roadway 16 or based on predicting the vehicle 12 will be at a peak of a hill based on the method 600. The method 600 may begin at decision block 602. In decision block 602, the proactive grade compensation module 50 determines a source of the grade angle $\theta_g$. Specifically, in response to determining the grade angle $\theta_g$ is equal to a look-ahead angle $\theta_{LA}$, the method 600 may proceed to block 604. In response to determining the grade angle $\theta_g$ is equal to the IMU-based grade angle $\theta_{gIMU}$, then the method 600 may proceed to block 606.

In block 604, the proactive grade compensation module 50 calculates a map-based acceleration command that is a product of a map-based gain value KpM and the look-ahead angle $\theta_{LA}$, where the map-based gain value KpM is based on the speed $V_x$ of the vehicle 12 and the mass of the vehicle 12.

In block 606, the proactive grade compensation module 50 calculates an IMU-based acceleration command that is a product of an IMU-based gain value KpIMU and the IMU-based grade angle $\theta_{gIMU}$, where the IMU-based gain value KpIMU is based on the speed $V_x$ of the vehicle 12 and the mass of the vehicle 12. It is to be appreciated that the map-based gain value KpM is greater than the IMU-based gain value KpIMU. Both blocks 604 and 606 may then proceed to block 608.

In block 608, the proactive grade compensation module 50 calculates a final acceleration command, where the prime mover 24 (FIG. 1) may accelerate or decelerate the vehicle 12 based on the final acceleration command. The final acceleration command is determined based on either the map-based gain value KpM or the IMU-based gain value KpIMU. The method 600 may then terminate.

Referring back to FIG. 2, the headway time adjustment module 58 adjusts a headway time based on the grade angle $\theta_g$ of the roadway 16 determined by the arbitration module 52 and the presence of a trailer that the vehicle 12 is towing.

FIG. 7 is a process flow diagram illustrating a method 700 for adjusting the headway time based on the presence of a trailer and the grade angle $\theta_g$ of the roadway 16. Referring to FIGS. 2 and 7, the method 700 may begin at decision block 702. In decision block 702, the headway time adjustment module 58 monitors the perception data collected by the plurality of perception sensors 22 to detect the presence of a trailer being towed by the vehicle 12. In response to detecting the presence of a trailer, the method 700 may proceed to decision block 704. Otherwise, the method 700 terminates.

In decision block 704, the headway time adjustment module 58 determines a sign of the grade angle $\theta_g$ of the roadway 16. In response to determining the sign of the grade angle $\theta_g$ of the roadway 16 is negative, the headway time adjustment module 58 determines the vehicle 12 is traveling downhill and proceeds to block 706. In response to determining the sign of the grade angle $\theta_g$ of the roadway 16 is positive, the headway time adjustment module 58 determines the vehicle 12 is traveling uphill and proceeds to block 708.

In block 706, the headway time adjustment module 58 calculates a downhill headway offset time that is a function of the grade angle $\theta_g$ of the roadway 16. Specifically, as the grade angle $\theta_g$ of the roadway 16 increases in the negative direction (i.e., the steeper the hill in the downhill direction), the downhill headway offset time increases in value. In block 708, the headway time adjustment module 58 calculates an uphill headway offset time that is a function of the grade angle $\theta_g$ of the roadway 16. Specifically, as the grade angle $\theta_g$ of the roadway 16 increases in the positive direction, the uphill headway offset time decreases in value. It is to be appreciated that the function to determine the downhill headway offset time and the function to determine the uphill headway offset time are non-symmetrical with respect to one another. That is, in other words, the downhill headway offset time will not result in the same absolute value as the uphill headway offset time when the uphill grade angle and the downhill grade angle have the same absolute values and are the same grade grade in opposing directions. It is also to be appreciated that the uphill grade angle and the downhill grade angle do not necessarily have the same absolute values. Both blocks 706 and 708 may then proceed to block 710.

In block 710, the headway time adjustment module 58 determines a total headway time. The total headway time is equal to an initial headway time plus the either the downhill headway offset time or the uphill headway offset time. The method 700 may then terminate.

Referring generally to the figures, the disclosed grade angle estimation system provides various technical effects and benefits. Specifically, the disclosed grade angle estimation system provides an approach to employ three-dimensional map data when determining the grade angle of the roadway the vehicle is presently traveling along at a look-ahead distance. Accordingly, various vehicular control systems such as the adaptive cruise control system may pre-emptively control the vehicle based on the grade angle of the roadway. The disclosed grade angle arbitration system also includes an arbitration strategy that employs measurements collected from the IMU when the grade angle of the road exceeds the predefined capped value of the three-dimensional map data as well as an arbitration error that also employs the measurements collected by the IMU when a difference between an IMU-based grade angle and a map-based angle falls outside an upper limit threshold value and a lower limit threshold value.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A grade angle estimation system for estimating a grade angle of a roadway that a vehicle is driving along, the grade angle estimation system comprising:

one or more controllers, wherein the one or more controllers include one or more processors that execute instructions to:

receive three-dimensional map data of the roadway and measurements indicating an inertial measurement unit (IMU)-based grade angle of the roadway collected by an IMU, wherein the three-dimensional map data is capped and omits the grade angle of the roadway once the grade angle exceeds a predefined capped value;

determine the IMU-based grade angle based on the measurements received by the IMU, wherein the IMU-based grade angle is measured at a current position of the vehicle along the roadway;

compare an absolute value of the IMU-based grade angle with a threshold grade value, wherein the threshold grade value is equal to the predefined capped value of the three-dimensional map data;

in response to determining the absolute value of the IMU-based grade angle is less than or equal to the threshold grade value, set the grade angle equal to a look-ahead angle, wherein the look-ahead angle is calculated based on the three-dimensional map data and represents the grade angle of the roadway at a look-ahead distance;

in response to determining the absolute value of the IMU-based grade angle is greater than the threshold grade value, set the grade angle equal to the IMU-based grade angle;

transmit the grade angle to one or more vehicular systems that are part of the vehicle, wherein the one or more vehicular systems determine one or more control actions of the vehicle based on the grade angle; and command the one or more vehicular systems to execute the one or more control actions based on the grade angle.

2. The grade angle estimation system of claim 1, wherein the one or more controllers execute instructions to:

in response to determining the grade angle is equal to the look-ahead angle, extract grade angle data from the three-dimensional map data;

transmit the grade angle data to a filter; and determine, by the filter, filtered grade data based on the grade angle data, wherein a time constant is introduced to the filtered grade data by the filter and the time constant includes a time lag.

3. The grade angle estimation system of claim 2, wherein the one or more controllers execute instructions to:

determine the time lag introduced to the filtered grade data; and perform a time shift correction that shifts a time of the filtered grade data by the time lag introduced by the time constant, wherein the filtered grade data determined by the filter compensates for the time lag.

4. The grade angle estimation system of claim 3, wherein the one or more vehicular systems include an adaptive cruise control system.

5. The grade angle estimation system of claim 4, wherein the one or more controllers execute instructions to:

determine a look-ahead grade of the roadway measured at the look-ahead distance based on the filtered grade data from the three-dimensional map data;

determine a difference between the look-ahead grade and a current grade, wherein the vehicle is positioned along the roadway at the current grade; and compare an absolute value of the difference with a threshold angle difference, wherein the threshold angle difference reflects a change in a road grade between a current position of the vehicle and the look-ahead distance.

6. The grade angle estimation system of claim 5, wherein the one or more controllers execute instructions to:

in response to determining the absolute value of the difference is greater than the threshold angle difference, determine the roadway is about to undergo a transition in the grade angle; and instruct the adaptive cruise control system to perform preemptive control based on the transition in the grade angle of the roadway.

7. The grade angle estimation system of claim 6, wherein the one or more controllers perform preemptive control by:

determining a source of the grade angle;

in response to determining the grade angle is equal to the look-ahead angle, calculating a map-based acceleration command that is a product of a map-based gain value and the look-ahead angle; and in response to determining the grade angle is equal to the IMU-based grade angle, calculating an IMU-based acceleration command that is a product of an IMU-based gain value and the IMU-based grade angle.

8. The grade angle estimation system of claim 5, wherein the one or more controllers execute instructions to:

in response to determining the absolute value of the difference is equal to or less than the threshold angle difference, predict the vehicle will be at a peak of a hill; and instruct the adaptive cruise control system to perform preemptive control based on predicting the vehicle to be at the peak of the hill.

9. The grade angle estimation system of claim 8, wherein the one or more controllers execute instructions to:

monitor perception data received from a plurality of perception sensors to determine the presence of a preceding vehicle located in front of the vehicle; and in response to determining the presence of a preceding vehicle, execute an object selection strategy to follow the preceding vehicle located in front of the vehicle at a defined headway distance.

10. The grade angle estimation system of claim 1, wherein the three-dimensional map data is high-definition (HD) map data.

11. The grade angle estimation system of claim 1, wherein the one or more controllers execute instructions to:

calculate a difference between the IMU-based grade angle and a map-based angle, wherein the map-based angle represents the grade angle of the roadway at a look-ahead distance of zero and is based on the three-dimensional map data;

compare the difference between the IMU-based grade angle and the map-based angle with an upper limit threshold value and a lower limit threshold value; and in response to determining the difference between the IMU-based grade angle and the map-based angle is either greater than the upper limit threshold value or less than the lower limit threshold value, set the grade angle equal to the IMU-based grade angle.

12. The grade angle estimation system of claim 1, wherein the one or more controllers execute instructions to:

monitor perception data collected by a plurality of perception sensors to detect the presence of a trailer being towed by the vehicle;

in response to detecting the presence of the trailer, determine a sign of the grade angle of the roadway; and in response to determining the sign of the grade angle of the roadway is negative, determine the vehicle is traveling downhill and calculate a downhill headway offset time that is a function of the grade angle of the roadway.

13. The grade angle estimation system of claim 12, wherein the one or more controllers execute instructions to:

in response to determining the sign of the grade angle of the roadway is positive, determine the vehicle is travelling uphill and calculate an uphill headway offset time that is a function of the grade angle of the roadway.

14. A method for estimating a grade angle of a roadway that a vehicle is driving along, the method comprising:

receiving, by one or more controllers, three-dimensional map data of the roadway and measurements indicating an inertial measurement unit (IMU)-based grade angle of the roadway collected by an IMU, wherein the three-dimensional map data is capped and omits the grade angle of the roadway once the grade angle exceeds a predefined capped value;

determining, by the one or more controllers, the IMU-based grade angle based on the measurements received by the IMU, wherein the IMU-based grade angle is measured at a current position of the vehicle along the roadway;

comparing, by the one or more controllers, an absolute value of the IMU-based grade angle with a threshold grade value, wherein the threshold grade value is equal to the predefined capped value of the three-dimensional map data;

in response to determining the absolute value of the IMU-based grade angle is less than or equal to the threshold grade value, setting the grade angle equal to a look-ahead angle, wherein the look-ahead angle is calculated based on the three-dimensional map data and represents the grade angle of the roadway at a look-ahead distance;

in response to determining the absolute value of the IMU-based grade angle is greater than the threshold grade value, setting the grade angle equal to the IMU-based grade angle;

transmitting the grade angle to one or more vehicular systems that are part of the vehicle, wherein the one or more vehicular systems determine one or more control actions of the vehicle based on the grade angle; and commanding the one or more vehicular systems to execute the one or more control actions based on the grade angle.

15. A vehicle, comprising:

a plurality of perception sensors;

a prime mover;

a braking system; and a grade angle estimation system for estimating a grade angle of a roadway that the vehicle is driving along, the grade angle estimation system comprising:

one or more controllers in electronic communication with the plurality of perception sensors, the prime mover, and the braking system, wherein the one or more controllers include one or more processors that execute instructions to:

receive three-dimensional map data of the roadway and measurements indicating an inertial measurement unit (IMU)-based grade angle of the roadway collected by an IMU, wherein the three-dimensional map data is capped and omits the grade angle of the roadway once the grade angle exceeds a predefined capped value;

determine the IMU-based grade angle based on the measurements received by the IMU, wherein the IMU-based grade angle is measured at a current position of the vehicle along the roadway;

compare an absolute value of the IMU-based grade angle with a threshold grade value, wherein the threshold grade value is equal to the predefined capped value of the three-dimensional map data;

in response to determining the absolute value of the IMU-based grade angle is less than or equal to the threshold grade value, set the grade angle equal to a look-ahead angle, wherein the look-ahead angle is calculated based on the three-dimensional map data and represents the grade angle of the roadway at a look-ahead distance;

in response to determining the absolute value of the IMU-based grade angle is greater than the threshold grade value, set the grade angle equal to the IMU-based grade angle;

transmit the grade angle to an adaptive cruise control system that is part of the vehicle, wherein the adaptive cruise control system determines one or more control actions of the vehicle based on the grade angle;

commanding the prime mover and the braking system to execute the one or more control actions based on the grade angle;

in response to determining the grade angle is equal to the look-ahead angle, extract grade angle data from the three-dimensional map data;

transmit the grade angle data to a filter;

determine, by the filter, filtered grade data based on the grade angle data, where a time constant is introduced to the filtered grade data by the filter and the time constant includes a time lag;

determine the time lag introduced to the filtered grade data; and perform a time shift correction that shifts a time of the filtered grade data by the time lag introduced by the time constant, wherein the filtered grade data determined by the filter compensates for the time lag.

16. The vehicle comprising the grade angle estimation system of claim 15, wherein the one or more controllers execute instructions to:

determine a look-ahead grade of the roadway measured at the look-ahead distance based on the filtered grade data;

determine a difference between the look-ahead grade and a current grade, wherein the vehicle is positioned along the roadway at the current grade; and compare an absolute value of the difference with a threshold angle difference, wherein the threshold angle difference reflects a change in a road grade between a current position of the vehicle and the look-ahead distance.

17. The vehicle comprising the grade angle estimation system of claim 16, wherein the one or more controllers execute instructions to:

in response to determining the absolute value of the difference is greater than the threshold angle difference, determine the roadway is about to undergo a transition in the grade angle; and instruct the adaptive cruise control system to perform preemptive control based on the transition in the grade angle of the roadway.

18. The vehicle comprising the grade angle estimation system of claim 17, wherein the one or more controllers perform preemptive control by:

determining a source of the grade angle;

in response to determining the grade angle is equal to the look-ahead angle, calculating a map-based acceleration command that is a product of a map-based gain value and the look-ahead angle; and in response to determining the grade angle is equal to the IMU-based grade angle, calculating an IMU-based acceleration command that is a product of an IMU-based gain value and the IMU-based grade angle.

19. The vehicle comprising the grade angle estimation system of claim 16, wherein the one or more controllers execute instructions to:

in response to determining the absolute value of the difference is equal to or less than the threshold angle difference, predict the vehicle will be at a peak of a hill; and instruct the adaptive cruise control system to perform preemptive control based on predicting the vehicle to be at the peak of the hill.

20. The vehicle comprising the grade angle estimation system of claim 19, wherein the one or more controllers execute instructions to:

monitor perception data received from a plurality of perception sensors to determine the presence of a preceding vehicle located in front of the vehicle; and in response to determining the presence of a preceding vehicle, execute an object selection strategy to follow the preceding vehicle located in front of the vehicle at a defined headway distance.

* * * * *